United States Patent [19]
Smith

[11] Patent Number: 6,094,165
[45] Date of Patent: Jul. 25, 2000

[54] COMBINED MULTI-BEAM AND SECTOR COVERAGE ANTENNA ARRAY

[75] Inventor: Martin Stevens Smith, Chelmsford, United Kingdom

[73] Assignee: Nortel Networks Corporation, Montreal, Canada

[21] Appl. No.: 08/903,840

[22] Filed: Jul. 31, 1997

[51] Int. Cl.[7] .............................. H01Q 3/22; H01Q 3/24; H01Q 3/26
[52] U.S. Cl. .......................... 342/373; 342/361; 342/362; 455/422; 455/424
[58] Field of Search .................................. 342/373, 361, 342/362; 455/422, 424

[56] References Cited

U.S. PATENT DOCUMENTS

| | | | |
|---|---|---|---|
| 4,223,310 | 9/1980 | Davidson et al. . | |
| 4,868,886 | 9/1989 | Assal et al. . | |
| 5,563,610 | 10/1996 | Reudink | 342/375 |
| 5,581,260 | 12/1996 | Newman | 342/374 |
| 5,629,713 | 5/1997 | Mailandt et al. | 343/808 |
| 5,682,168 | 10/1997 | James et al. | 343/713 |

FOREIGN PATENT DOCUMENTS

| | | |
|---|---|---|
| 0639035 | 2/1995 | European Pat. Off. . |
| WO9623329 | 8/1996 | WIPO . |

OTHER PUBLICATIONS

"Wireless Mobile Data Networking—The CDPD Approach," dated Jul. 16, 1997, http://www.cdpd.org/public/whatis/whatis.html.

*Primary Examiner*—Theodore M. Blum
*Attorney, Agent, or Firm*—Baker Botts L.L.P.

[57] ABSTRACT

A beam forming apparatus and method for forming a plurality of directional beams within a sector, as well as a full sector coverage beam is disclosed, wherein uplink reception diversity is maintained, through provision of a either a single facet antenna or a pair of single facet antennas. Two implementations are disclosed: a first implementation employs orthogonal polarization diversity from a single antenna facet, whereas a second implementation employs space diversity from a pair of spaced apart antenna facets. A first implementation employing polarization diversity comprises an antenna having an array of dipole pairs, dipoles of each pair being positioned orthogonally from each other. The dipole pairs are driven on a downlink, to form a plurality of directional beams having first polarization, and a full sector coverage beam having second polarization. On an uplink, a first plurality of directional beams have first polarity and a second cospatially overlapping set of directional beams have second polarity are formed. A first full sector coverage beam having first polarity spatially overlaps a second full sector beam having second polarity.

18 Claims, 11 Drawing Sheets

COMBINED MULTI-BEAM AND SECTOR COVERAGE ANTENNA ARRAY

FIELD OF THE INVENTION

The present invention relates to the field of cellular radio communication systems, and particularly although not exclusively to a method and apparatus for forming a plurality of beams from a single antenna aperture.

BACKGROUND TO THE INVENTION

Conventional cellular radio systems which are currently in widespread use throughout the world providing telecommunications to mobile users are designed around a plurality of geographical cell areas, usually of nominally hexagonal shape, each cell being served by a base station with which a plurality of mobile stations within the cell communicate. By dividing a geographical area into the plurality of cell areas, carrier frequencies used to communicate between the base stations and mobile stations can be re-used from cell to cell. The number of mobile stations which can be supported within the geographical area is limited by the available number of carrier frequencies. Base stations are expensive, and require extensive effort in obtaining planning permission for their erection. In some areas, suitable base station sites may not be available. In general, an object of cellular radio communication system design is to have as few base stations as possible, whilst supporting as many mobile stations as possible. Consequently, it is an on-going objective of cellular radio communication system design to increase the traffic carrying capacity of base stations.

Where base stations are permitted, reasons of planning restrictions and cost may limit the size of masts and towers used to support antenna arrangements. Available space for antennas at the tops of towers is limited. It is another ongoing objective of cellular radio system design to provide coverage for a cellular area, using antennas having a minimum size and weight. Reduction in size and weight allows reduced size of mast or tower structures, and may make a difference between being able to deploy a base station or not. Additionally, having smaller antennas has manufacturing and transportation advantages relating to the antennas themselves.

A further problem encountered in cellular radio communication systems is that of signal fading. Signal fading may occur on an up-link communication between a mobile station and a base station due to multi-path reflections of a transmitted signal causing partial cancellation of each other at the base station.

SUMMARY OF THE INVENTION

According to a first aspect of the present invention there is provided a beam former apparatus for a cellular radio base station, said apparatus comprising:
  an antenna comprising a plurality of array elements, said antenna capable of forming a plurality of directional beams and at least one a full sector beam;
  a first beam former means capable of forming said plurality of directional beams;
  a second beam former means capable of forming said at least one full sector coverage beam.

Preferably said first beam former is connected with a plurality of said elements, for forming said plurality of directional beams.

Preferably said second beam former means is connected with a plurality of said elements for forming a said full sector coverage beam.

Preferably said first beam former means is connected with a plurality of digital channels, for carrying said digital channels on said plurality of directional beams.

Preferably said digital channels comprise digital advanced mobile phone service channels in accordance with international standards IS-54/IS-136 to IS-138.

Preferably said second beam former means is connected with one or more analogue channels for carrying said one or more analogue channels on a said full sector coverage beam.

Said analogue channels may comprise analogue advanced mobile phone service (AMPS) channels, in accordance with international standards IS-54/IS-136 to IS-138.

Said analogue channel may comprise a Cellular Digital Packet Data (CDPD) analogue channel.

According to a second aspect of the present invention there is provided a base station apparatus for a cellular radio communications system, said base station apparatus comprising:
  a diversity antenna arrangement;
  a main full sector beam former arranged for forming at least one main full sector uplink beam;
  a main multibeam beam former arranged for forming a plurality of main directional uplink beams;
  a diverse full sector beam former arranged for forming at least one diverse full sector uplink beam; and
  a diverse multibeam beam former arranged for forming a plurality of diverse directional uplink beams.

Said antenna arrangement may comprise a plurality of dual polarized elements arranged in an array, said array comprising a single antenna aperture.

Said antenna arrangement may comprise:
  a first array of elements comprising a first antenna aperture; and
  a second array of elements comprising a second antenna aperture,
  wherein said first and second antenna apertures are spaced apart from each other, forming a space diversity antenna arrangement.

Preferably, there are provided a plurality of amplifiers positioned between said diversity antenna and said beam former means. Positioning the amplifiers between the elements of the antenna and the beam former means may allow the combination of multiple beams and a full sector beam from a single antenna aperture.

The invention includes a method of providing beam coverage for a sector of a cellular radio cell area, said method comprising the steps of:
  forming a plurality of directional beams in said sector;
  forming a full sector coverage beam in said sector;
  communicating digital communications signals on said plurality of directional beams;
  communicating analogue communications signals on said full sector coverage beam.

Said analogue signals may comprise analogue advance mobile phone service (AMPS) signals in accordance with international standard IS-54/IS-136 to IS-138.

Said analogue signals may comprise analogue CDPD signals.

Preferably said digital signals comprise digital time division multiplexed signals in accordance with international standard IS-54/IS-136 to IS-138.

The invention includes a method of providing beam coverage for a cell area of a cellular radio system, said method comprising the steps of:
  forming a plurality of main directional beams within said cell area;

forming a main full sector coverage beam within said cell area;

forming a plurality of diverse directional beams within said cell area;

forming a diverse full sector beam within said cell area;

wherein said main beams and said diverse beams are distinguished from each other by having different polarizations to each other.

Preferably said main beams and said diverse beams are formed from a single antenna aperture.

The invention includes a method of providing beam coverage for a cell area of a cellular radio system, said method comprising the steps of:

forming a plurality of main directional beams within said cell area;

forming a main full sector coverage beam within said cell area;

forming a plurality of diverse directional beams within said cell area;

forming a diverse full sector beam within said cell area;

wherein said main set of beams are formed by a first antenna aperture, and said diverse set of beams are formed by a second antenna aperture.

According to a third aspect of the present invention there is provided a base station antenna for a cellular radio communication system, said antenna comprising:

an elongate ground plane having first and second sides;

a plurality of dual polarized elements spaced apart from each other, said dual polarized elements situated between said sides of said ground plane.

Each said dual polarized element suitably comprises a pair of dipoles, each dipole oriented transverse to a said side of said ground plane.

Suitably, each said element is spaced apart from a neighboring said element by a distance in the range 0.3 to 1.0 wavelengths.

Preferably each said element is spaced apart from a neighboring said element by a distance in the range 0.2 to 0.6 wavelengths in a first direction.

Preferably each said element is spaced apart from a neighboring said element by a distance in the range 0.5 to 0.9 wavelengths in a second direction.

Suitably the antenna is adapted for mounting such that a main length of said elongate ground plane extends substantially vertically.

Suitably each said dual polarized element comprises a first dipole and a second dipole, wherein said first dipole extends in a direction transverse to a direction of the said second dipole.

Said first dipole may extend in a direction transverse to a vertical direction and transverse to a horizontal direction; and said second dipole may extend in a direction transverse to the vertical and transverse to the horizontal.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best modes contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

In the best mode described herein, specific implementations may have application in addressing aspects of operation specific to the conventional North American AMPS cellular radio system. However, the skilled person will recognize that features within the general scope of the invention are applicable to other cellular radio systems, for example GSM, PCS 1900, Code Division Multiple Access (CDMA), and the scope of the present invention is limited only by the features included in the claims herein.

The AMPS cellular radio system is a prevalent cellular radio system used particularly in North American markets and is based on international standard IS-54[1], which is an analogue/digital dual mode standard operating at 850 MHz band, and more recently superseded by international standard IS-136 to IS-138[1] dual mode analogue/digital mobile standard encompassing operation at 850 MHz band and 1900 MHz band. The terms IS-54/IS-136 are used in the art to refer generally to International Standard IS-54 and related standards and International standard IS-136 to IS-138 which define protocols and operation of analogue and digital AMPS operation. The terms IS-54, IS-136, IS-136 to IS-138 used herein are meant generally to refer to this set of standards.

The North American AMPS mobile communication system operates under two modes. A set of frequency slots each 30 kHz wide are provided, each of which can be used as an analogue channel, or as a time division multiple access digital channel (digital AMPS TDMA). At any base station, the majority of available carrier frequencies are used to carry analogue and digital AMPS signals, primarily voice channels. However, one or a small number of carrier frequencies per cell are also allocated for carrying packet data under a system cellular digital packet data known as CDPD[2]. Under this system, communication between for example lap-top computers may be made over the AMPS cellular system. A particular problem which arises in relation to the North American AMPS systems is to increase the voice channel carrying capacity within a cellular area, particularly for digital AMPS communication, whilst continuing to support analogue AMPS and CDPD communications. Solutions which enable increased voice channel traffic capacity whilst taking account of signal fading, and a requirement for minimization of number of antennas and size and weight of antennas are required.

Figure 1:
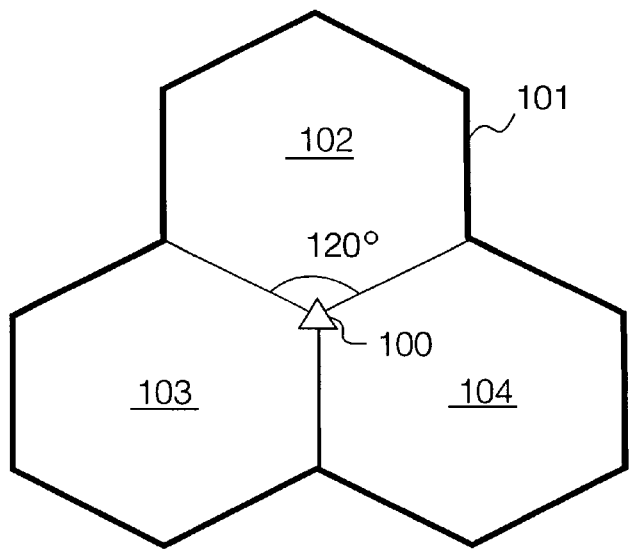
FIG. 1 illustrates schematically a beam pattern of a tri-cellular area comprising three nominally hexagonal edge-excited cells surrounding a cellular radio base station.

Two types of prior art beam coverage patterns are common for serving cell areas of cellular radio systems. Firstly, in a tri-cellular arrangement as shown schematically in FIG. 1 herein, a base station 100 serves three adjacent hexagonal cell areas 101–103. This type of arrangement, common in Europe, is otherwise known as an edge excitation arrangement, because each of the cells 101–103 (otherwise termed sectors) are excited from an antenna positioned at their edges, with a nominal 120° azimuth angle of excitation about a bore sight of the antenna.

Figure 2:
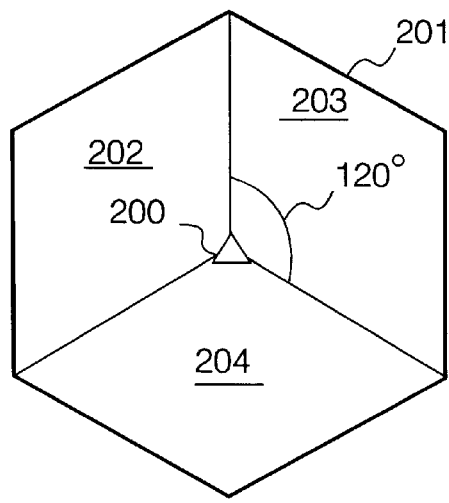
FIG. 2 illustrates schematically a conventional center excited hexagonal cell, divided into a conventional tri-sectorized center excited arrangement.

Secondly, a prior art center excited cell arrangement as illustrated schematically in FIG. 2 herein, in which a radio base station 200 is situated at a center of a nominally hexagonal cell area 201, is common in North America. The nominally hexagonal cell area 201 is partitioned into three sectors, each sector subtending an azimuth angle of 120° at the base station 200.

In the present specification, the term "sector" is defined herein as being a geographical area of coverage adjacent a radio base station which is covered by one or a plurality of beams connected with the base station, said area of coverage subtending an azimuth angle of less than 360° around the base station. The terms "full sector beam" and "full sector coverage beam" are constructed accordingly as beams which substantially cover approximately a whole of such a sector. A single cell (sector) 102 of a tri-cellular arrangement, subtending an angle of 120° azimuth at the base station 100 is an example of a sector as defined herein. A 120° sector 203 of a center excited hexagonal cell 201, which subtends an azimuth angle of 120° at a base station 200 as described with reference to FIG. 2 herein, is another example of a sector within the present definition.

Figure 3:
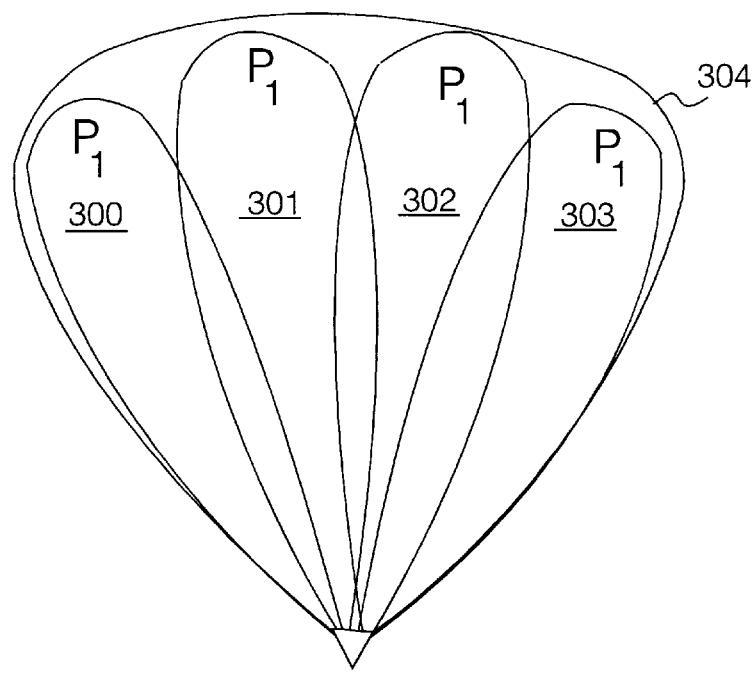
FIG. 3 illustrates a downlink azimuth beam pattern according to a first implementation of the present invention.

Referring to FIG. 3 herein, there is illustrated schematically in plan view a downlink azimuth beam pattern coverage of a nominal 120° sector of a cellular area according to a first specific implementation of the present invention. On the downlink, the sector is served by a plurality of relatively narrow directional beams 300–303 of a first polarity P1. In FIG. 3, four overlapping directional beams are shown, and in the best mode herein, each directional beam may have an optimal −3 dB beamwidth of the order 35–40°. Co-spatially with the directional beams is formed a broad sector coverage beam 304 of a second polarity P2, the second polarity being opposite to the first polarity. Typically the broad sector coverage beam encompasses a whole 120° sector, and may have a −3 dB azimuth beamwidth of order 105°. In the best mode herein, the first and second polarities may comprise ±45° orientation, although in other embodiments, left and right handed circular polarizations, or vertical and horizontal polarizations may be employed.

The directional beams are occupied by carrier frequencies which carry digital AMPS signals, which are time division multiplexed on each beam. Each of downlink directional beams 300 to 303 operate at different carrier frequencies to each other. Because of the directionality of the downlink beams, for a cellular radio system employing a plurality of sectors each covered as shown in FIG. 3, a carrier to interference ratio (C/I ratio) for each cell is improved, since the directionality of downlink beams reduces co-frequency interference between adjacent or next but one adjacent cellular areas. The reduction in C/I ratio enables tighter frequency re-use on the downlink beams, and a consequent increase in traffic carrying capacity across the cellular radio system. In the best mode herein, a base station re-use factor N=7 may be reduced on the downlink for digital AMPS to achieve a base station re-use factor N=4, due to use of the plurality of directional beams in each sector. Because the number of carrier frequencies per sector can be increased, an overall traffic carrying capacity for digital AMPS traffic may be improved by the use of directional beams on the downlink.

On the other hand, the broad sector coverage beam 304 is occupied by analogue AMPS and CDPD transmission. Since the requirement for analogue AMPS and CDPD traffic is relatively lower than the requirement for digital TDMA AMPS traffic, adequate coverage of a sector for analogue AMPS and CDPD may be made using a single broad sector coverage beam 304.

Figure 4:
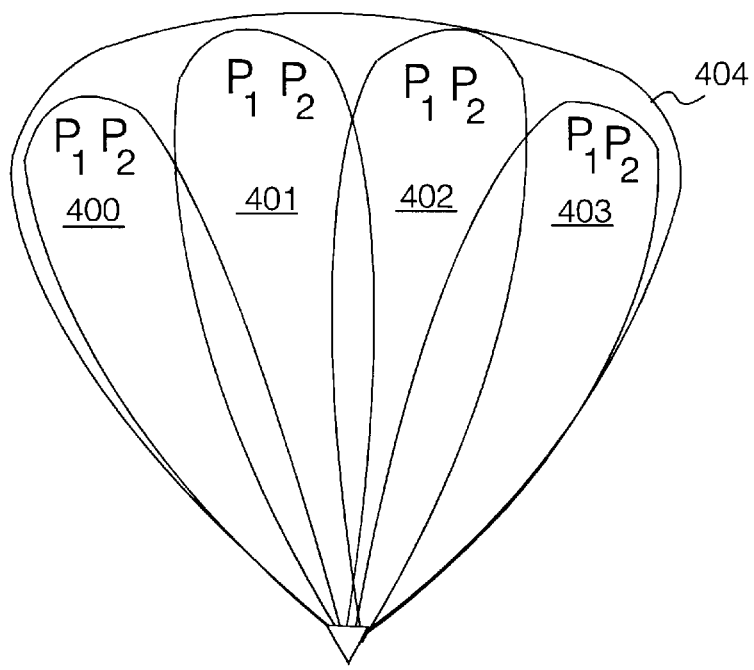
FIG. 4 illustrates schematically an uplink azimuth beam pattern according to a first implementation of the present invention.

Referring to FIG. 4 herein, there is illustrated schematically in plan view an azimuth beam forming pattern for an uplink coverage of a 120° sector of a cellular area according to a first implementation of the present invention. The uplink beam pattern comprises a plurality of directional beams 400 to 403 occupying the 120° sector area, each being directional in azimuth, and a broad sector coverage beam 404 occupying substantially a whole of the sector.

Each of the plurality of relatively narrow directional beams 400 to 403 employs polarization diversity, receiving signals transmitted from mobile stations within the sector on a first polarization P1, and/or a second polarization P2, the first and second polarizations P1, P2 being opposite to each other. In the best mode herein, first and second polarizations P1, P2 are deployed at ±45° to vertical, polarizations P1, P2 being opposite and orthogonal to each other. However, in other embodiments, the first and second polarizations may be vertical and horizontal respectively, or left hand circular, right hand circular respectively. Typically, in the best mode herein, each of the directional beams has a −3 dB beamwidth of the order 35 to 40°, and the directional beams may overlap each other within the sector, in a digital AMPS deployment. In the best mode herein, four directional beams per sector are envisaged as optimum, although the invention is not restricted to such number. Use of the first and second polarizations within a directional beam enables polarization diversity on the uplink for each beam. Signal fading which occurs on the first polarization may be compensated for by detection of a corresponding signal in the second polarization and vice versa. Signals from each polarization may be either combined, or selected in preference to one another to obtain the best available signal on each uplink directional beam.

On the broad sector uplink beam 404, first and second polarizations P1, P2 are employed, the polarizations being as described with reference to the directional beams 400 to 403. The broader full sector coverage uplink beam 404 covers substantially the whole of the 120° sector. The broad sector coverage beam also employs polarization diversity, receiving signals on first and second polarizations P1, P2, the polarizations employed for the broad sector coverage beam 404 being the same as those used for the plurality of directional beams 400 to 403.

The plurality of directional beams 400 to 403 are allocated for carrying digital time division multiplexed AMPS traffic, thereby increasing the digital AMPS channel traffic carrying capacity, whereas the broader full sector coverage uplink beam 404 is allocated for analogue AMPS and analogue CDPD traffic. Similarly, as with the downlink case, usage of a plurality of directional beams enables improved carrier to interference performance over the cellular radio system as a whole, thereby allowing tighter frequency re-use across the system as a whole on the uplink for digital AMPS traffic. Typically, in the best mode herein, an uplink frequency re-use improvement from N=7 to N=4 may be achieved for digital AMPS by use of a plurality of directional beams in which four beams per sector are deployed, each beam having a nominal −3 dB beamwidth typically in the range 35° to 40°.

Figure 5:
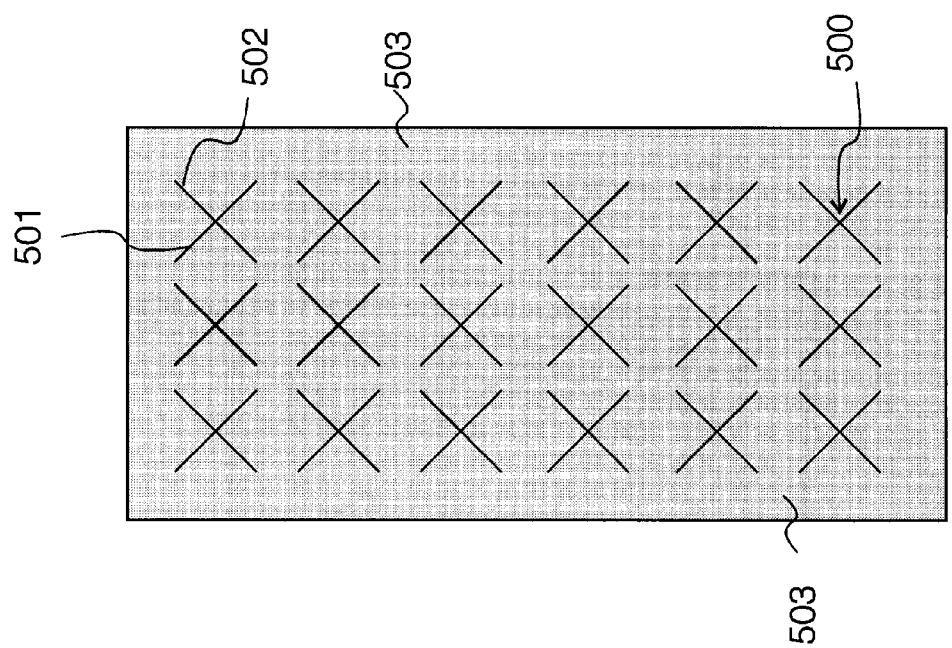
FIG. 5 illustrates schematically in bore sight view a polarization antenna facet according to a first implementation of the present invention.

The downlink and uplink azimuth beam patterns represented in FIGS. 3 and 4 herein may be formed through a single antenna aperture as shown schematically in FIG. 5 herein. The antenna arrangement supports dual polarized ±45° uplink and downlink beams according to IS-54 TDMA bands 824–894 MHz, as well as full sector coverage beams orientated at ±45°. The antenna comprises an array of dual polarized elements 500 arranged in three columns, each of six rows, the elements are spaced apart from each other in a horizontal direction by a distance of 0.4 wavelengths (or typically 140 millimeters in an IS-54 implementation). The dual polarized elements are spaced apart from each other by a distance of around 0.7 wavelengths (245 millimeters in an IS-54 AMPS deployment) in a vertical direction. Overall dimensions of the antenna are of the order 1470 millimeters (4.2 wavelengths) height and 525 millimeters (1.5 wavelengths) width. The array comprises 3 columns each of six rows of dual polarized elements. Each element is located one quarter wavelength above the reflecting ground plane 503.

Figure 6:
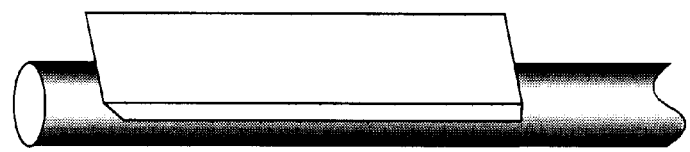
FIG. 6 illustrates schematically the antenna of FIG. 5 deployed on a base station mast.

The antenna may be mounted vertically as illustrated schematically in FIG. 6 herein, presenting a single aperture from which the plurality of uplink and downlink beams as illustrated schematically in FIGS. 3 and 4 herein may be formed. In the best mode herein, directional beams are directed at ±13° and ±36° from bore sight in azimuth.

Each dual polarized element comprises a pair of dipoles 501, 502 oriented transverse to each other and at ±45° to horizontal, where the antenna is mounted with its main length vertically. Each dipole of the dipole pair operates over the uplink and downlink bands of IS-54 TDMA (824–894 MHz). The beamwidth of the plurality of directional beams is determined by an electrical size of the antenna aperture, and hence a width of the antenna is strongly influenced by required beamwidth. To increase beam directivity, the aperture is increased in the vertical direction relative to the horizontal direction. The antenna width is limited by selection of an aspect ratio, which is typically narrower than 2 to 1.

Each dipole of the pair is typically of the order 0.4 to 0.5 wavelengths in length, located 0.25 wavelengths above the reflecting ground plane. The ground plane size is typically 4.2 wavelengths height, by 1.5 wavelengths width. Typically, the antenna may achieve a gain of 17 dBi peak for all beams and an edge of sector level is −4 dB with respect to peak. An edge of sector performance may be improved by increasing a phase slope across the array, and hence orientating the beams further from bore sight. Side lobe levels of better than 10 dB below peak of their own beam may be achievable. The whole antenna array may typically weigh of the order 25 kilograms. The antenna supports electrical down-tilting of directional beams in the elevation plane.

Figure 7:
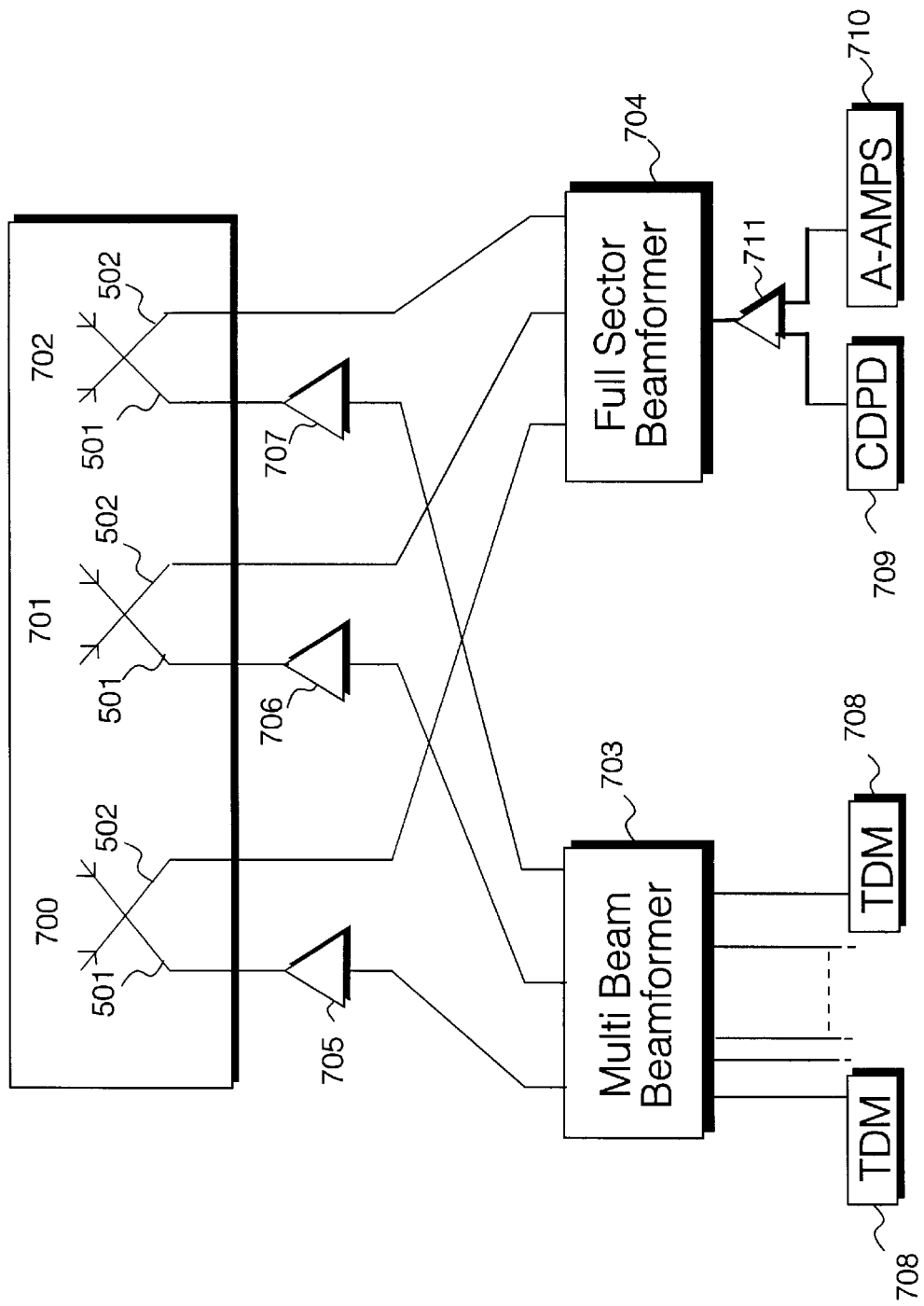
FIG. 7 illustrates schematically a first downlink beam forming apparatus for forming a downlink azimuth beam pattern as illustrated in FIG. 1 herein.

Referring to FIG. 7 herein, there is illustrated schematically an arrangement of a downlink beam forming apparatus for driving an antenna as described with reference to FIGS. 5 and 6 to form a downlink azimuth beam pattern as illustrated schematically with reference to FIG. 3 herein. In FIG. 7, a left element 700, a center element 701 and a right element 702, as seen in bore sight view are shown. Each dual polarized element represents a respective left, center or right column if such elements, each column being driven by a corresponding respective output of a single multibeam beam former 703 through a linear amplifier 705, 706, 707, there being one linear power amplifier per each column of elements, and each column of elements being driven by a corresponding respective output of full sector beam former 704.

The downlink beam forming apparatus comprises a multibeam beam former 703 configured to drive a first dipole 501 of each dual polarized element the first dipole of each dipole pair being oriented in a first orientation relative to vertical; a full sector beam former 704, the full sector beam former driving a second dipole 502 of each dipole pair of the row of dipole pairs; a plurality of linear amplifiers 705–707, each linear amplifier driving a respective corresponding column of said first dipole elements in accordance with an input from the multibeam beam former 703; the multibeam beam former 703 operating to drive the first dipole elements of the dipole pairs to produce a plurality of directional beams radiating outwardly to cover a sector area as illustrated schematically in FIG. 3 herein, the multibeam beam former 703 receiving digital time division multiplexed signal channels from a plurality of digital TDMA transmitters 708, for transmitting digital AMPS channels over the plurality of downlink directional beams in a first polarization determined by orientation of first set of dipole elements 501; the full sector beam former 704 receiving an input of a CDPD transmitter 709 and an analogue AMPS transmitter 710, via linear amplifier 711 receiving inputs from the CDPD transmitter and analogue transmitter, the full sector beam former driving each of a set of second dipole elements 502 of the dipole element pairs to form a full sector coverage downlink beam in a second polarization, the second polarization determined by orientation of the second set of dipole elements which are positioned transversely to the first set of dipole elements and transverse to horizontal.

The full sector beam former 704 drives primarily the second dipole element 502 of each center column of dipole pairs 701 to form the full sector coverage downlink beam 304 having second polarization. Second dipole elements of adjacent outer columns of dipole pairs 700, 702 to either side of center column of dipole pairs 701 are driven by full sector beam former 704 with a phase and amplitude weighting selected and tuned to adjust the width and azimuth angle of the full sector downlink beams. Conventionally, a full sector downlink beam may be formed by a single dipole element or column of dipole elements situated in front of a shaped ground plane. However, in the antenna shown in FIG. 5, the ground plane is substantially planar, and thus second dipole element 502 of center column of dipole element pairs 701 cannot take advantage of a shaped ground plane for forming a full sector downlink beam. Further, there is mutual coupling between the columns of dipole element pairs 700–702 such that adjacent columns of dipole elements pairs 700, 702 are parasitically excited on driving center column of dipole pairs 701, which mis-shapes the beam produced by center column of dipole pairs 701 unless such mutual coupling is corrected electronically. Thus, in the best mode herein to achieve a full sector beam, adjacent second dipole elements 502 of adjacent columns of dipole element pairs 700, 702 are driven by suitable phase and amplitude signals at a same frequency as center column of dipole pairs 701 in order to compensate for mutual coupling, and to form a downlink full sector coverage beam of appropriate azimuth pattern.

Figure 8:
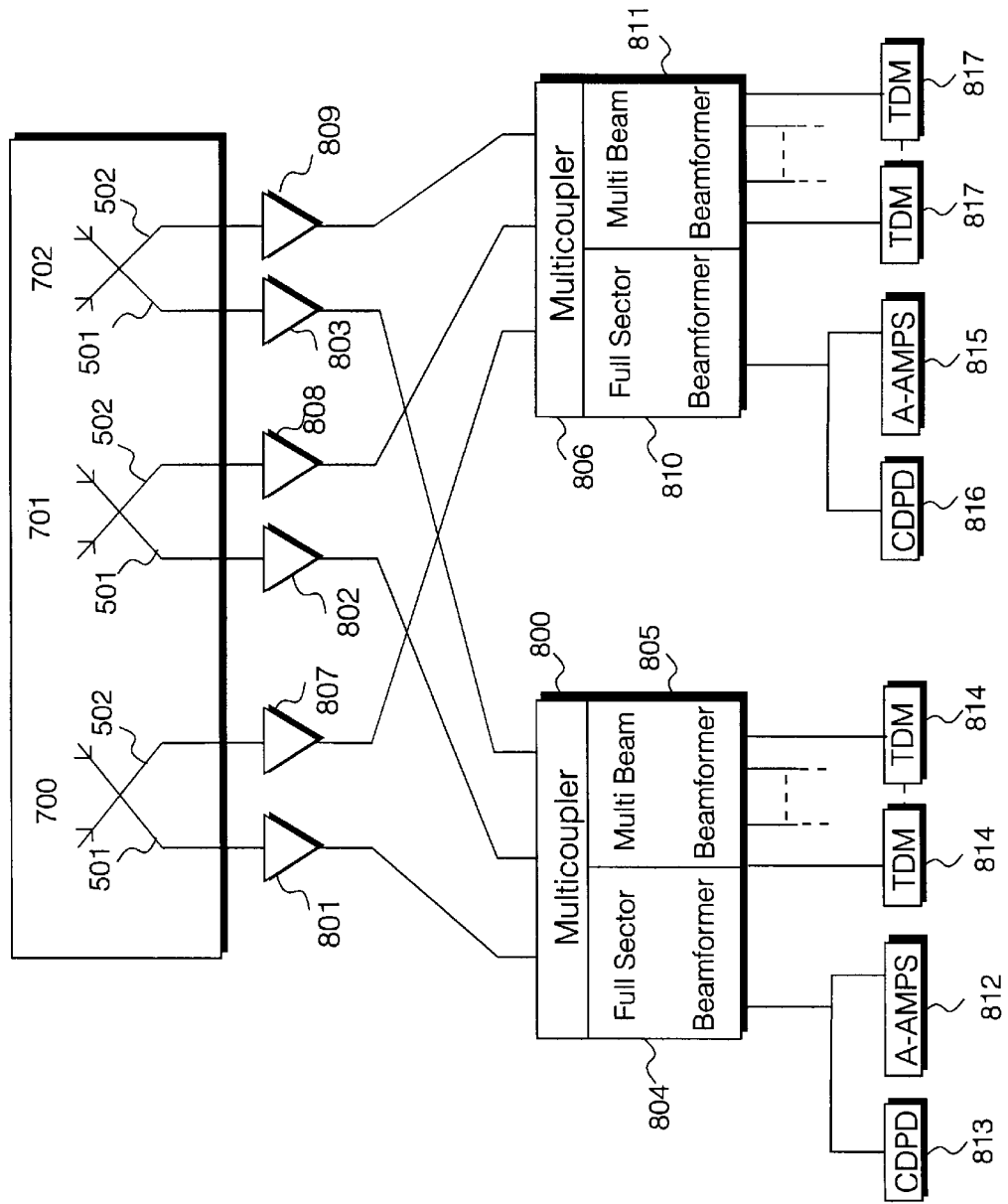
FIG. 8 illustrates schematically a first uplink beam forming apparatus for forming an uplink beam pattern as illustrated with reference to FIG. 4 herein, according to the first implementation of the present invention.

Referring to FIG. 8 herein, there is illustrated an uplink beam former apparatus for forming a set of uplink beams, as illustrated schematically with reference to FIG. 4 herein, from an antenna as illustrated schematically in FIG. 5 herein. First set of dipole elements 501 of a first orientation are connected to first multicoupler arrangement 800 through a first set of low noise amplifiers 801–803, between the first dipole elements and first multicoupler. First multicoupler 800 feeds a full sector beam former 804 and a first multibeam beam former 805; a second set of second dipole elements 502 of each of the dipole element pairs feed second multicoupler 806, through a second set of low noise amplifiers 807–809 between the second dipole elements and the second multicoupler, second multicoupler 806 feeding second full sector beam former 810 and second multibeam beam former 811. First full sector beam former 804 feeds an analogue AMPS channel 812, and an analogue CDPD channel 813. First multibeam beam former 805 feeds a plurality of digital AMPS time division multiplexed channels 814. Second full sector beam former 810 feeds second analogue AMPS channel 814 and second analogue CDPD channel 815, and second multibeam beam former 811 feeds a plurality of second digital AMPS time division multiplex channels 816.

A plurality of first dipole elements 501 of each of the left, center and right columns 700, 701, 702 are fed to an input of the first multicoupler 800, and hence to an input of first full sector beam former 804, one input of first full sector beam former 804 per column, Similarly, each one of three inputs of first multibeam beam former 805 receives signals of a respective column of elements. Each of three inputs of second full sector beam former 810 receives a signal from a corresponding respective column of second dipole elements 502, and each of three inputs of second multibeam beam former 811 receives a signal from a corresponding respective said column of second dipole elements 502.

Polarization diversity on the uplink is provided for the analogue AMPS and analogue CDPD channels as follows. First full sector beam former 801 receives a first polarization uplink signal over a first polarization of full sector coverage uplink beam 404, whereas second full sector beam former 810 receives analogue AMPS and analogue CDPD signals from mobile stations within an area covered by a second polarization of full sector coverage uplink beam 404. The outputs from the first polarization analogue AMPS channel 812 and second polarization analogue AMPS channel 815 are combined to obtain a diverse analogue AMPS signal on the uplink. Similarly, an analogue CDPD output signal of first polarization from first full sector beam former 804 and a analogue CDPD signal of second polarization from second full sector beam former 810 are combined to form a diverse analogue CDPD signal, determined from first and second CDPD channels 813, 816.

Similarly, polarization diversity on each of the plurality of directional beams 400–403 is obtained as follows. The first multibeam beam former 805 feeds a first plurality of digital AMPS TDMA channels 814 with signals received over a first plurality from first set of dipole elements 501. Similarly, second multibeam beam former 811 receives a second set of signals corresponding to uplink beams 400–403 which are fed to second digital AMPS TDMA channels 817, the second set of signals having second polarization received on second set of dipole elements 502. The first and second sets of uplink digital AMPS TDMA signals received in the first and second polarizations are combined by combining first and second TDMA channel sets 814 and 817 to obtain a plurality of polarization diversity digital AMPS TDMA signals on each of the plurality of directional beams 400–403 on the uplink.

Because a single antenna aperture is re-used for full sector and multiple uplink beams, received uplink signals are split during beam forming. By positioning the plurality of low noise amplifiers between the antenna elements and the beam formers, on the uplink a noise figure may be set prior to splitting of received uplink signals in the beam formers.

Figure 9:
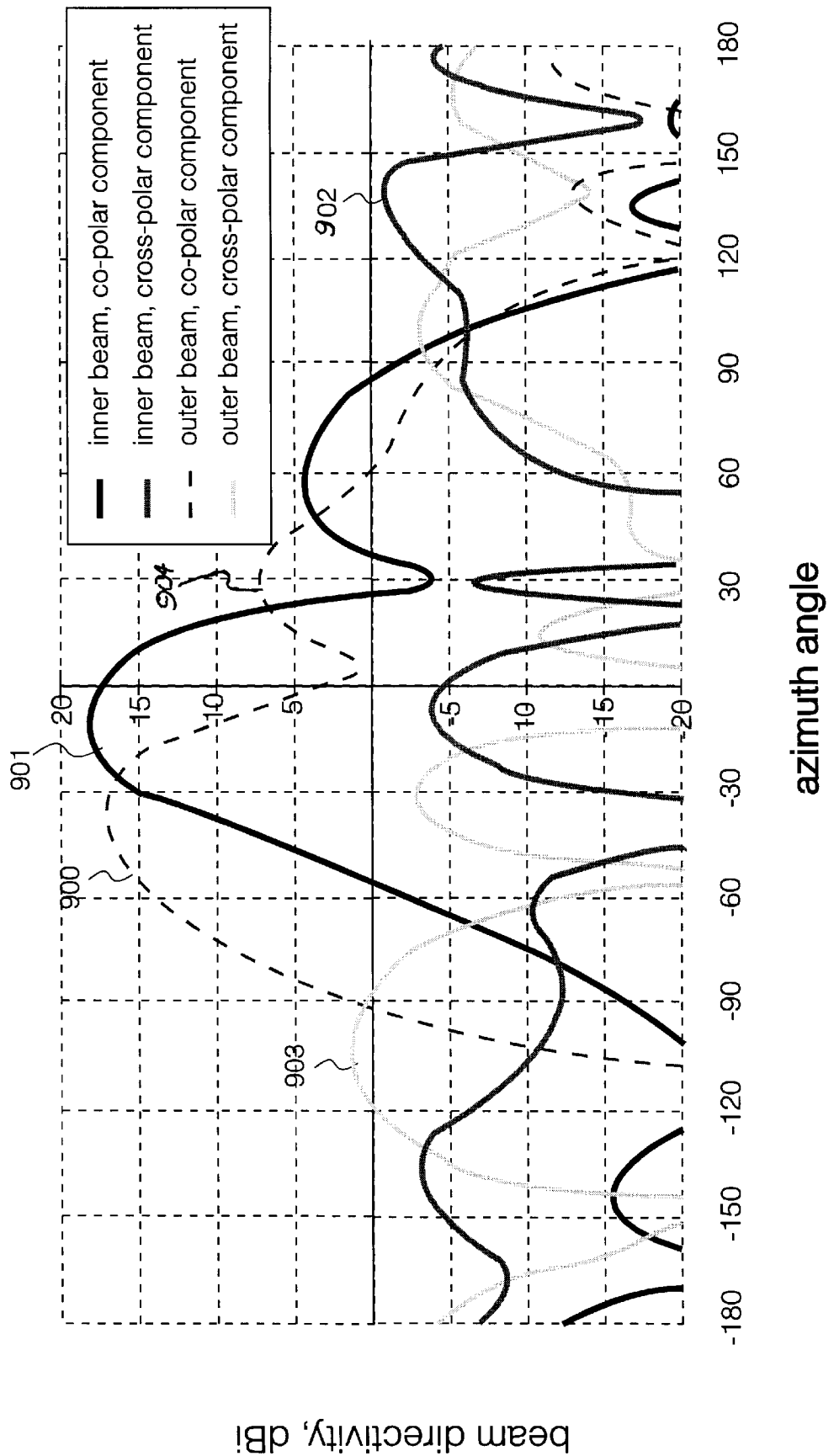
FIG. 9 herein illustrates schematically a plot of downlink beam power against azimuth angle from bore sight for a pair of directional downlink beams according to the first implementation of the present invention.

Referring to FIG. 9 herein, there is illustrated a plot of power against azimuth angle from bore sight for inner and outer directional beams formed by an antenna as described with reference to FIG. 5 herein, driven in accordance with a downlink or uplink multibeam beam former 703, 805, 811 as described with reference to FIGS. 7 or 8 herein. Outer beam 900 corresponds to a downlink or uplink outer beam 300, 303, 400, 403 as shown schematically in FIGS. 3 or 4 herein, whereas inner beam 901 corresponds to a downlink or uplink inner beam 301, 302, 401, 402 as illustrated in FIGS. 3 or 4 herein. Beams 900, 901 are formed on the downlink by the first set of dipole elements 501, in a first polarization or on the uplink by first and second dipole elements 501, 502. Directional beams 900, 901 also incur a cross polar component shown schematically by azimuth power distributions 902, 903 for the outer beam 900 and inner beams 901 respectively. As illustrated in FIG. 9, a main lobe of directional outer beam 900 is separated from its first side lobe 904 by a power difference of around 10 dB. Similarly, main lobe of directional inner beam 901 is separated from its first side lobe by a power difference of around 15 dB.

In FIG. 9, inner and outer beams of just two directional beams of an array of four beams are shown. Opposite inner and outer beams 302, 303, 402, 403 in FIGS. 3 or 4 are formed similarly.

Figure 10:
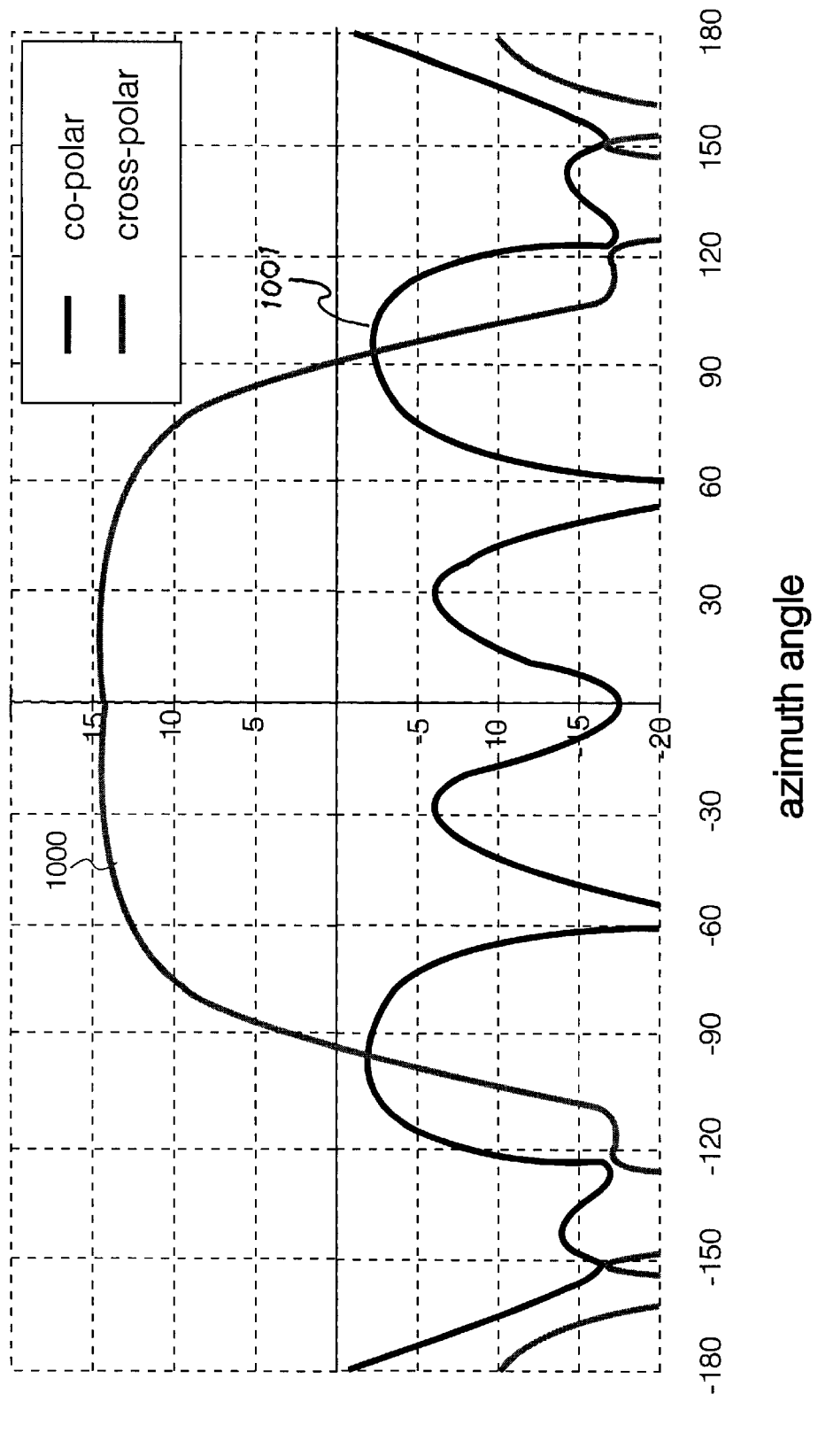
FIG. 10 herein illustrates schematically a plot of downlink beam power against azimuth angle from bore sight of a sector coverage beam according to the first implementation of the present invention.

Referring to FIG. 10 herein, there is illustrated schematically a plot of power level against azimuth angle from bore sight for a full sector downlink or uplink coverage beam, formed by an antenna as described as reference to FIG. 5 herein, when driven by a full sector beam former apparatus as described with reference to FIGS. 7 or 8 herein. The downlink full sector coverage beam, having second polarity P2, opposite to polarity P1 is formed by full sector beam former 704, driving second dipole elements 502 of the rows of dipole elements of the array of dipole elements comprising the antenna.

As illustrated schematically in FIG. 10 herein, full sector coverage beam 1000 has −3 dB beamwidth of the order 105° and is substantially symmetrical around bore sight of the antenna. The full sector coverage beam 1000 incurs a cross polar beam pattern 1001 as shown in FIG. 8 having lobes of the order −18 dB below a peak lobe level of main full sector coverage beam 1000.

There will now be described a second specific implementation according to the present invention, in which space diversity is employed, by use of a pair of antenna facets 1100, 1101 spaced apart from each other and mounted on a base station tower as shown schematically in FIG. 11 herein. The second specific implementation is described herein with reference to North American IS-54 and IS-136 to IS-138 AMPS deployments, however it will be understood by persons skilled in the art that features of the second implementation are broadly applicable to other cellular radio systems such as GSM, PCS-1900, and the invention is limited only by the features recited in the claims herein.

Figure 12:
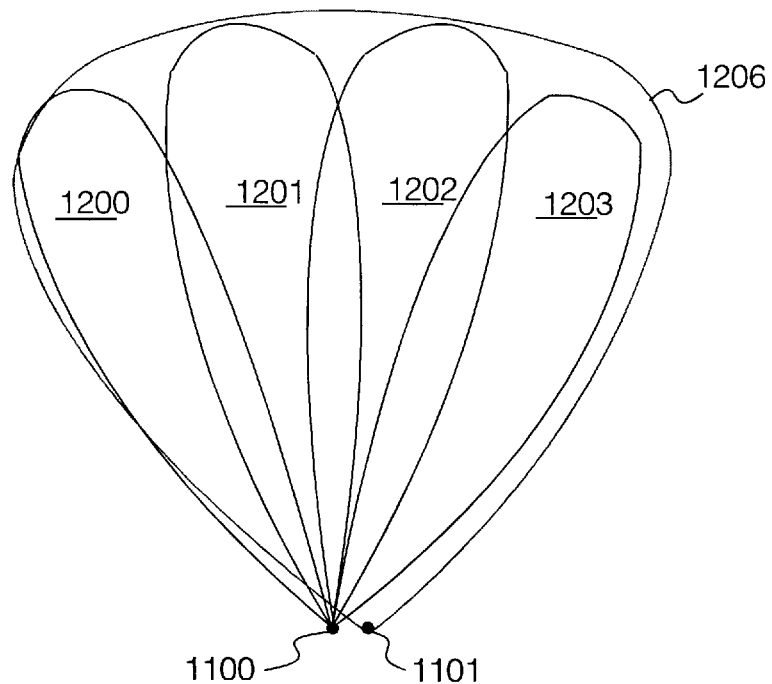
FIG. 12 herein illustrates schematically a downlink azimuth beam pattern according to the second implementation of the present invention.

Referring to FIG. 12 herein, there is illustrated a downlink azimuth beam pattern for a 120° sector coverage in a cellular radio system operating in accordance with IS-54/IS-136 to IS-138 North American AMPS. On a downlink path, a plurality of directional beams 1200–1203 are formed from a pair of spaced apart antenna apertures 1100, 1101. A first antenna 1100 forms the plurality of transmitted directional downlink beams, and the second antenna 1101 forms the full sector coverage downlink beam 1206. On the downlink, each of the plurality of directional beams, each operating at a different carrier frequency, carries a digital AMPS time division multiplexed channel. Full sector coverage beam 1206 carries analogue AMPS and analogue CDPD channels.

By providing a plurality of directional beams on the downlink, a traffic capacity increase may be achieved, by greater frequency reuse across the network, whilst maintaining analogue AMPS and CDPD facility through the full sector coverage beam 1206.

Figure 13:
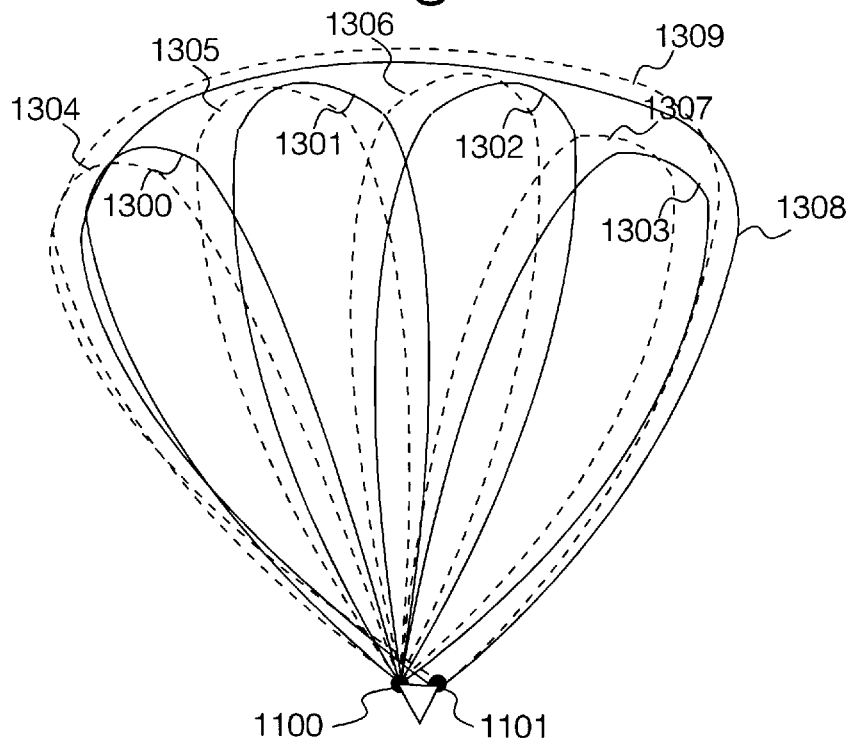
FIG. 13 herein illustrates schematically an uplink azimuth beam pattern according to the second implementation of the present invention.

Referring to FIG. 13 herein, there is shown a corresponding uplink azimuth beam pattern utilizing space diversity. On the uplink, a plurality of first directional beams 1300–1303 are formed by first antenna 1100, and a plurality of spatially overlapping diversity beams 1304–1307 are formed by second antenna 1101 spaced apart from the first antenna. The diverse directional beams overlap the first plurality of directional uplink beams 1300–1303 thereby achieving spatial diversity over a plurality of directional uplink beams in a 120° sector. Typically, each directional beam on the downlink and uplink may have a −3 dB beamwidth of the order 35–45° azimuth, and have a main lobe of the order 10 dB above its highest side lobe. Each directional beam 1300–1307 on the uplink carries digital AMPS time division multiplexed data voice channel traffic, thereby increasing an uplink capacity for digital AMPS TDMA by enabling greater frequency reuse across a cellular radio system.

On the other hand, there is formed a first uplink full sector coverage beam 1308 by first antenna array 1100 and a corresponding spatially overlapping second uplink full sector beam formed by second antenna 1101, thereby achieving space diversity over full sector coverage by a plurality of spatially overlapping full sector beams. The spatially overlapping full sector beams are assigned to analogue CDPD communication and analogue AMPS communication on the uplink, thereby achieving space diversity for analogue AMPS and CDPD from the pair of antennas 1100, 1101.

Figure 14:
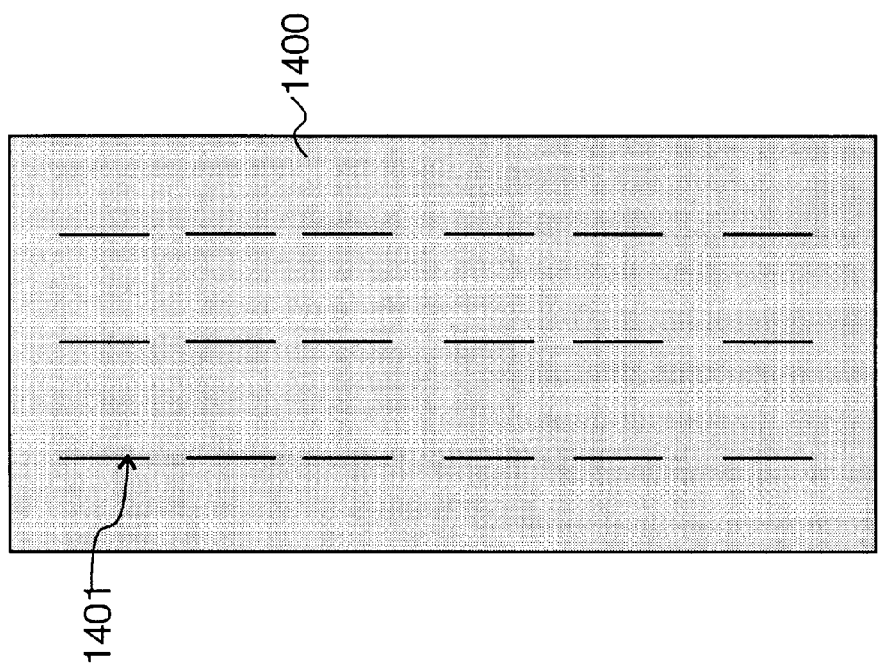
FIG. 14 illustrates schematically a bore sight view of an antenna facet according to the second implementation of the present invention.
Figure 11:
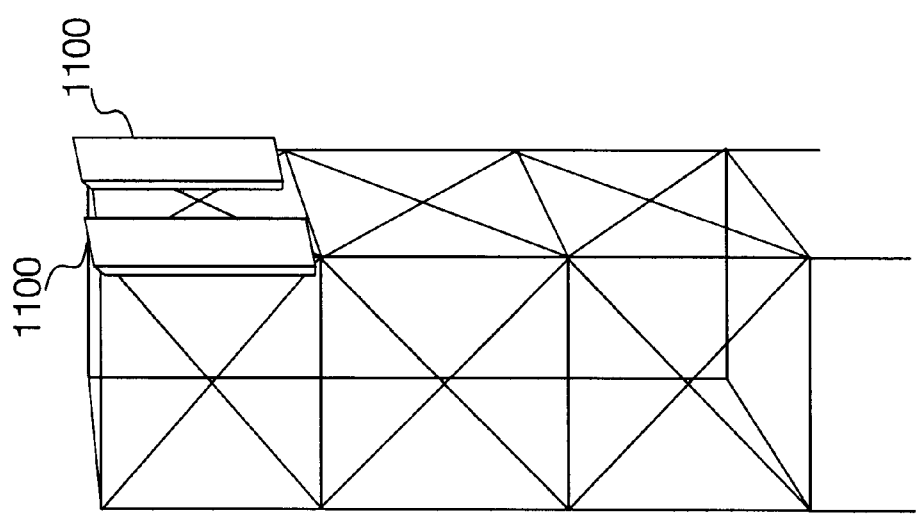
FIG. 11 herein illustrates schematically a space diversity antenna deployment on a base station tower according to a second implementation of the present invention.

Referring to FIG. 14 herein, there is illustrated an antenna, comprising the first or second space diversity antennas 1100, 1101 in FIG. 11. The antenna comprises an elongate ground plane 1400, in front of which are positioned a plurality of dipoles 1401 arranged in an array of rows and columns. In a specific embodiment herein, six rows each of three columns of dipoles are provided, although the invention is not limited to such an array. Typically, elements have their main length positioned substantially vertically and spaced apart from the ground plane by a distance of 0.25 wavelengths. Elements are spaced apart from their nearest neighbors horizontally by a distance of 0.4 wavelengths and vertically by a distance of approximately 0.7 wavelengths.

Figure 15:
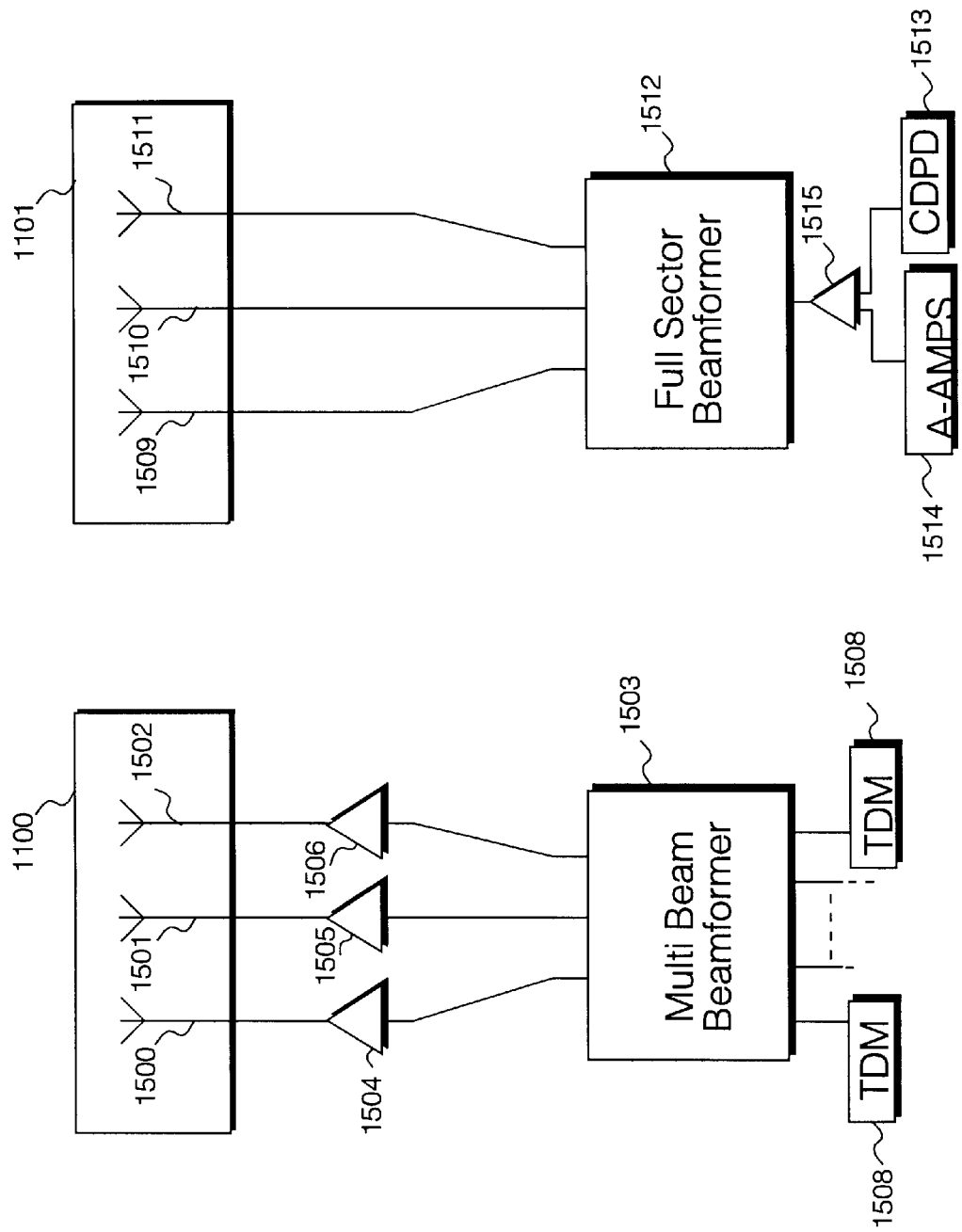
FIG. 15 herein illustrates schematically a second downlink beam forming apparatus for forming a downlink beam pattern as described with reference to FIG. 12 herein.

Referring to FIG. 15 herein, there is illustrated schematically a beam forming apparatus for forming the plurality of downlink beams as shown schematically in FIG. 12 herein. Columns of antenna elements 1500–1502 of first antenna 1100 are driven by a multibeam beam former 1503 through a plurality of linear amplifiers 1504–1506 one per each column of antenna elements. In FIG. 15 there is illustrated only one antenna elements each of columns 1500–1502 of first antenna 1100, being representative of the respective columns of such elements. A plurality of digital AMPS TDMA channels are transmitted on beams formed by multibeam beam former 1503, through an array of digital AMPS TDMA transmitters 1508 which feed digital AMPS TDMA channel inputs into multibeam beam former 1503.

A second antenna 1101 comprises a left, center and right columns of second dipole elements 1509, 1510, 1511 respectively, each column of second dipole elements receiving a signal from corresponding respective output of full sector beam former 1512. A full sector coverage beam formed by the second antenna elements 1509–1511 on the downlink is as shown schematically by beam 1206 in FIG. 12. A downlink CDPD transmitter 1513, and a downlink analogue AMPS transmitter 1514 input analogue CDPD and AMPS signals into full sector beam former 1512 via linear amplifier 1515 for deploying analogue CDPD and AMPS transmissions across a full sector coverage downlink beam.

A center dipole element column 1510 is primarily excited by full sector beam former 1512, with phase and amplitude varied signals being transmitted by adjacent outer second dipole columns 1509, 1511 either side of center second dipole column 1510, for forming an appropriate beam for covering a full sector, the phase and amplitude varied signals supplied to the outer second dipole columns compensating for mutual coupling of the outer dipole columns with the inner dipole columns.

Figure 16:
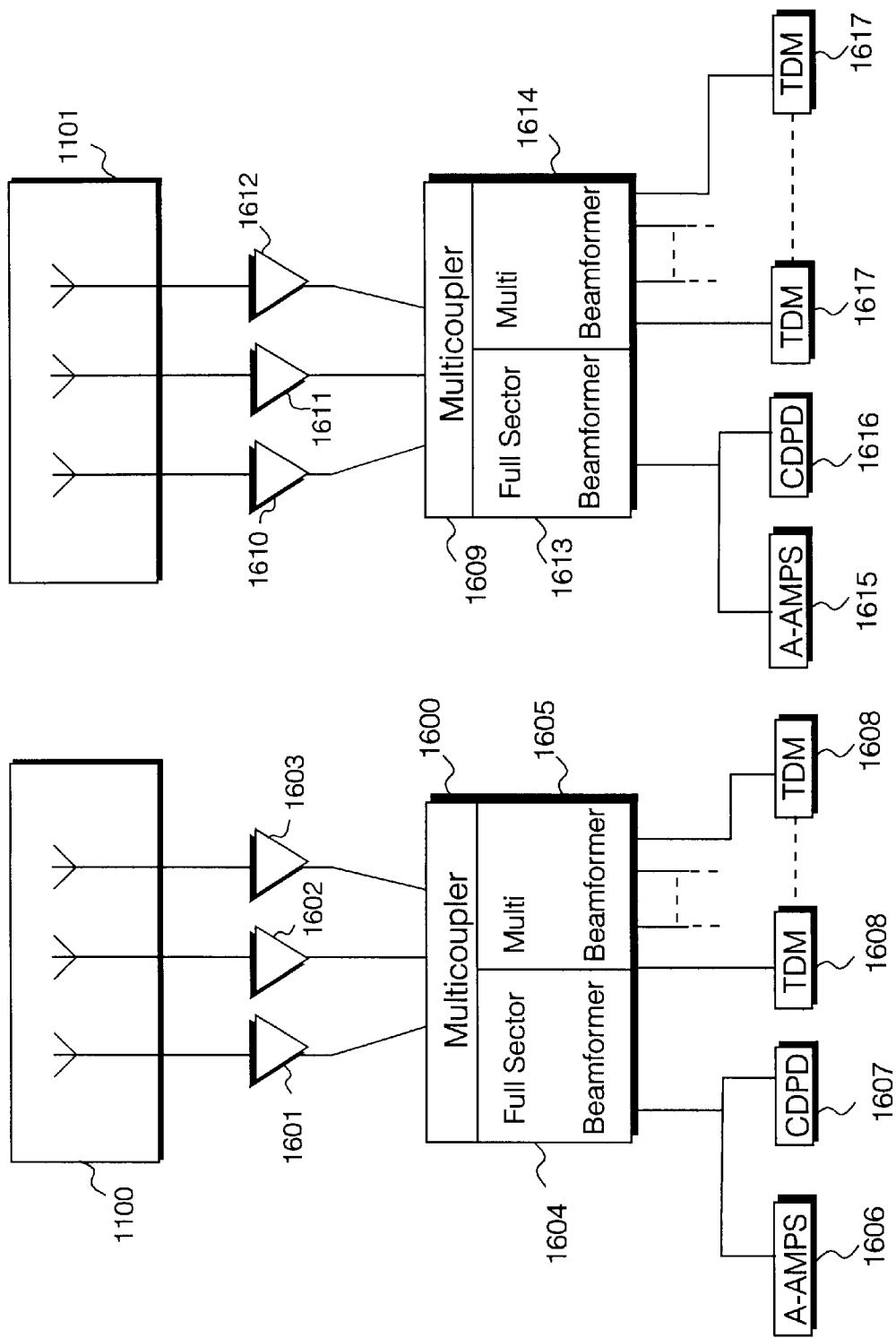
FIG. 16 herein illustrates schematically a second uplink beam forming apparatus for forming a space diversity uplink azimuth beam pattern as described with reference to FIG. 13 herein.

Referring to FIG. 16 herein, there is illustrated a beam forming apparatus forming a plurality of space diverse uplink beams as illustrated schematically with reference to FIG. 13 herein. First space diversity antenna 1100 is connected to first multicoupler 1600, by a plurality of linear amplifiers 1601–1603 first multicoupler 1600 being connected to first full sector beam former 1604 and first multibeam former 1605. First full sector beam former 1604 is connected to analogue AMPS transceiver 1606 and analogue CDPD transceiver 1607 for receiving uplink analogue AMPS and analogue CDPD signals from a full sector uplink beam formed by first antenna 1100. First multibeam beam former 1605 receives uplink digital AMPS TDMA signals from the plurality of uplink beams formed by first antenna 1100, and supplies uplink digital AMPS TDMA signals to a plurality of TDMA transceivers 1608.

A second dipole set of second antenna 1101 are connected to second multicoupler 1609 through a second plurality of linear amplifiers 1610–1612 between the antenna elements and the second multicoupler, which is connected with second full sector beam former 1613 and second multibeam beam former 1614. Second full sector beam former 1613 is connected with second analogue AMPS transceiver 1615 for receiving a diverse analogue AMPS channels from diverse full sector coverage beam at second antenna 1101, and similarly second full sector beam former 1613 is connected to second CDPD transceiver 1616 for receiving a second diverse CDPD channel from a diverse full sector beam formed at second antenna 1101. Second multibeam beam former 1614 is connected to a plurality of digital AMPS TDMA transceivers 1617, which receive a plurality of digital AMPS TDMA channels from the plurality of diverse directional uplink beams 1304–1307 formed at second diverse antenna 1101.

The second implementation herein may provide increase in digital AMPS TDMA channel capacity via provision of a plurality of uplink and downlink beams over a sector, whilst maintaining diversity reception and full sector analogue AMPS and full sector analogue CDPD coverage, through usage of a pair of antenna facets.

REFERENCES

[1] International Organization for Standardization, 1 rue Varembre, Geneva, Switzerland.
[2] CDPD Forum Inc, 401 North Michigan Avenue, Chicago, Ill. 60611, USA.

| Abbreviations | |
|---|---|
| AMPS | Advanced Mobile Phone Service |
| CDMA | Code Division Multiple Access |
| CDPD | Cellular Digital Packet Data |
| GSM | Groupe Systeme Mobile |
| PCS | Personal Communications Service |
| TDMA | Time Division Multiple Access |

What is claimed is:

1. A beam former apparatus for a cellular radio base station, said apparatus comprising:
    a single antenna comprising a plurality of array elements, said antenna for forming a plurality of directional beams and at least one full sector coverage beam;
    a first beam former means operatively coupled to said single antenna for forming said plurality of directional beams and wherein said first beam former means is connected with a plurality of digital channels for carrying said digital channels on said plurality of directional beams; and
    a second beam former means operatively coupled to said antenna for forming said at least one full sector coverage beam.

2. The apparatus as claimed in claim 1, wherein said first beam former is connected with said plurality of array elements, for forming said plurality of directional beams.

3. The apparatus as claimed in claim 1, wherein said second beam former means is connected with a plurality of said array elements for forming a said full sector coverage beam.

4. A beam former apparatus for a cellular radio base station, said apparatus comprising:
    a single antenna comprising a plurality of array elements, said antenna for forming a plurality of directional beams and at least one full sector coverage beam;
    a first beam former means operatively coupled to said single antenna for forming said plurality of directional beams; and
    a second beam former means operatively coupled to said antenna for forming said at least one full sector coverage beam wherein said second beam former means is connected with at least one analogue channels for carrying said at least one analogue channels on said full sector coverage beam.

5. The apparatus as claimed in claim 4, wherein a said analogue channel comprises a cellular digital packet data (CDPD) analogue channel.

6. A base station apparatus for a cellular radio communications system, said base station apparatus comprising:
    a diversity antenna arrangement;
    a main full sector beam former arranged for forming at least one main fill sector uplink beam and a main multibeam beam former arranged for forming a plurality of main directional uplink beams, both said full sector beam and said multisector beams being formed from a common array;
    a diverse full sector beam former arranged for forming at least one diverse full sector uplink beam and a diverse multibeam beam former arranged for forming a plurality of diverse directional uplink beams, both said full sector beam and said multisector beams being formed from a common array;
    wherein said antenna arrangement comprises a plurality of dual polarized elements arranged in an array, said array comprising a single antenna aperture.

7. The base station as claimed in claim 6, wherein said antenna arrangement comprises:
    a first array of elements comprising a first antenna aperture; and
    a second array of elements comprising a second antenna aperture,
    wherein said first and second antenna apertures are spaced apart from each other, forming a space diversity antenna arrangement.

8. The base station as claimed in claim 6, comprising a plurality of amplifiers, operatively coupled between said diversity antenna arrangement and said beam formers.

9. A method of providing beam coverage for a sector of a cellular radio cell area, said method comprising the steps of:
    forming a plurality of directional beams in said sector;
    forming a full sector coverage beam in said sector; both said full sector coverage beam and said plurality of directional beams being formed from a common array;
    communicating digital communications signals on said plurality of directional beams;
    communicating analogue communications signals on said full sector coverage beam.

10. The method as claimed in claim 9, wherein said analogue signals comprise analogue cellular digital packet data (CDPD) signals.

11. A method of providing beam coverage for a cell area of a cellular radio system, said method comprising the steps of:
    forming a plurality of main directional beams within said cell area;

forming a main full sector coverage beam within said cell area;

forming a plurality of diverse directional beams within said cell area;

forming a diverse full sector beam within said cell area; all of said beams being formed from a common array, wherein said main beams and said diverse beams are distinguished from each other by having different polarizations to each other.

12. The method as claimed in claim 11, wherein said main beams and said diverse beams are formed from a single antenna aperture.

13. A base station antenna for a cellular radio communication system, said antenna comprising:

an elongate ground plane;

a plurality of dual polarized elements spaced apart from each other, said dual polarized elements situated between said sides of said ground plane; said antenna being arranged in order to form a plurality of directional beams and at least one full sector beam:

a first beam former means for forming said plurality of directional beams;

a second beam former means for forming said at least one full sector coverage beam.

14. The antenna as claimed in claim 13, wherein each said element is spaced apart from a neighboring said element by a distance in the range 0.3 to 1.0 wavelengths.

15. The antenna as claimed in claim 13, wherein each said element is spaced apart from a neighboring said element by a distance in the range 0.2 to 0.6 wavelengths in a first direction.

16. The antenna as claimed in claim 13, wherein each said element is spaced apart from a neighboring said element by a distance in the range 0.5 to 0.9 wavelengths in a second direction.

17. The antenna as claimed in claim 13 adapted for mounting such that a main length of said elongate ground plane extends substantially vertically.

18. The antenna as claimed in claim 13, wherein each said dual polarized element comprises:

a first dipole; and a second dipole;

wherein said first dipole extends in a direction transverse to a direction of said second dipole.

* * * * *

UNITED STATES PATENT AND TRADEMARK OFFICE
CERTIFICATE OF CORRECTION

PATENT NO. : 6,094,165

DATED : July 25, 2000

INVENTOR(S) : Smith

It is certified that error appears in the above-identified patent and that said Letters Patent is hereby corrected as shown below:

IN THE CLAIMS:

Column 14, line 21: "fill" should read -- full --
Column 15, line 23: "beams;" should read -- beams; and --
Column 16, line 20: "dipole;" should read -- dipole, --

IN THE SPECIFICATION:

Column 12, line 29: "elements" should read -- element --
Column 12, line 37: "columns" should read -- column --
Column 13, line 17: "channels" should read -- channel --; and "diverse" should read -- a diverse --

Signed and Sealed this

Fifteenth Day of May, 2001

Attest:

NICHOLAS P. GODICI

Attesting Officer

Acting Director of the United States Patent and Trademark Office